United States Patent [19]

Stevels

[11] 4,185,201
[45] Jan. 22, 1980

[54] X-RAY DETECTOR

[75] Inventor: Albert L. N. Stevels, Eindhoven, Netherlands

[73] Assignee: U.S. Philips Corporation, New York, N.Y.

[21] Appl. No.: 885,669

[22] Filed: Mar. 13, 1978

[30] Foreign Application Priority Data

Mar. 28, 1977 [NL] Netherlands ................. 7703295

[51] Int. Cl.² ................................................. G01J 1/58
[52] U.S. Cl. ..................................... 250/483; 250/486
[58] Field of Search ................................ 250/483, 486

[56] References Cited

U.S. PATENT DOCUMENTS

| | | | |
|---|---|---|---|
| 2,559,219 | 7/1951 | Ludeman | 250/483 |
| 2,739,258 | 3/1956 | Sheldon et al. | 250/483 |
| 2,921,201 | 1/1960 | Lieb | 250/483 |
| 3,527,710 | 9/1970 | Toma et al. | 250/483 |
| 3,974,389 | 8/1976 | Ferri et al. | 250/483 |
| 4,029,851 | 6/1977 | Degenhardt | 250/483 |
| 4,076,897 | 2/1978 | Ray | 250/483 |

OTHER PUBLICATIONS

Image Intensifier by Dreyfus, IBM Tech. Disc. Bull., vol. 16, No. 9, Feb. 1974, p. 3102.

*Primary Examiner*—Harold A. Dixon
*Attorney, Agent, or Firm*—Norman N. Spain

[57] ABSTRACT

The X-ray detection element of an X-ray detector is composed of a fluorescent material having a short afterglow and a high sensitivity to the X-radiation to be detected. For the fluorescent material use is notably made of cerium-activated phosphors such as yttrium phosphors, lanthanum phosphors or lutetium phosphors.

8 Claims, 4 Drawing Figures

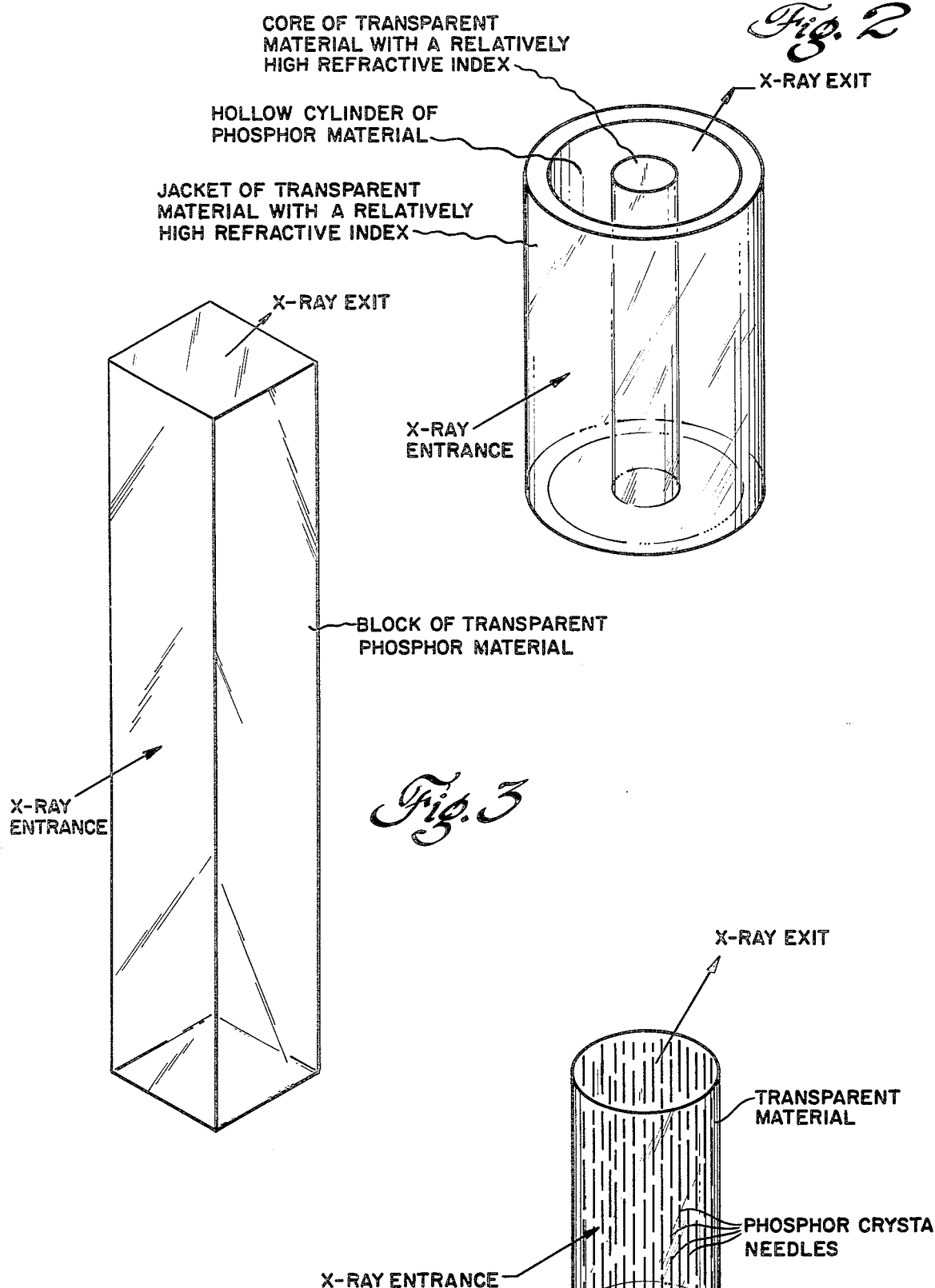

X-RAY DETECTOR

BACKGROUND OF THE INVENTION

The invention relates to an X-ray detector comprising an X-ray detection element and a detection device which is responsive to fluorescent radiation generated in the X-ray detection element.

In a known detector of this kind, described in U.S. Pat. No. 3,866,047, the X-ray detection element is formed by monocrystals of, for example, thallium-activated sodium iodide. These X-ray detection crystals have the drawback of excessive afterglow for given applications, notably when measurements are performed with a comparatively high degree of repetition. It has also been proposed to utilize a monocrystal of bismuth germanate as the X-ray detection crystal. Bismuth germanate is known to have a comparatively short afterglow, but in comparison with said sodium iodide crystal it has the drawback that its efficiency is 10 to 25 times lower. For medical X-ray equipment such as, for example, a scanning X-ray examining apparatus, the low efficiency of the bismuth germanate X-ray detection element is unfavourable because the radiation dose required for the patient is then increased. If measurement with an acceptable dose is demanded, very severe requirements must be imposed as regards the electronic section of the detection device.

SUMMARY OF THE INVENTION

The invention has for its object to provide an X-ray detector in which the above enumerated drawbacks are eliminated. According to the invention this object is achieved in an X-ray detector of the described kind by the X-ray detection element one that contains a fluorescent material which has a short afterglow as well as a high efficiency for the X-radiation to be detected.

BRIEF DESCRIPTION OF THE DRAWINGS

In the drawing

FIG. 2 shows, in perspective view, a preferred embodiment of an X-ray detection element employed in the X-ray detector of the invention.

FIG. 3 shows, in perspective view, a second preferred embodiment X-ray detection element employed in the X-ray detector of the invention.

FIG. 4 shows, in perspective view, still another preferred embodiment of an X-ray detection element employed in an X-ray detector of the invention.

Figure 1:
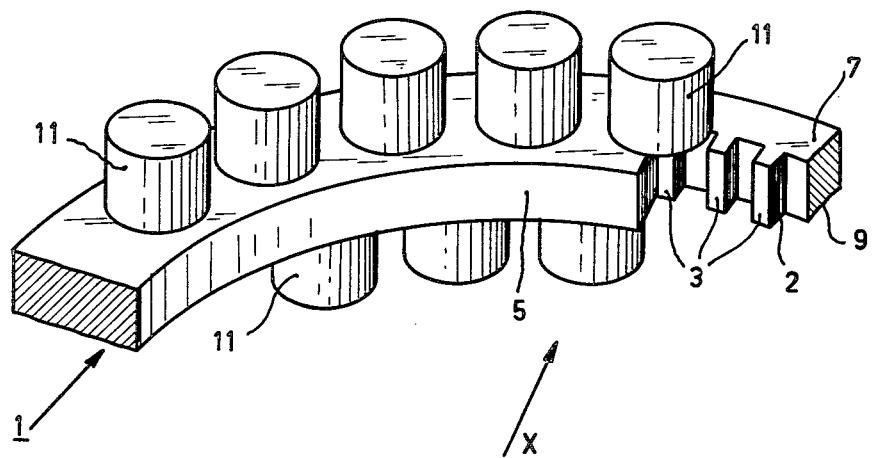
FIG. 1 shows, in perspective view, an X-ray detector according to the invention.

Because the fluorescent material in accordance with the invention combines short afterglow with high radiation sensitivity, an X-ray detector can be designed which enables measurements up to high frequencies. As a lower radiation dose may be employed for the patient to be examined, the electronics of the detection device may be simpler and hence cheaper and more reliable.

The fluorescent material in a preferred embodiment consists of a cerium-activated phosphor such as, for example, $Y_2SiO_5$: Ce, $Y_2Si_2O_7$: Ce or $Y_3Al_5O_{12}$: Ce. Cerium-activated phosphors intrinsically have a comparatively short afterglow and can be used for the manufacture, depending on the properties of the material, of a monocrystal, a block combined by sintering, provided it is sufficiently transparent, a light conductive element provided with a powdery layer, or a transparent substrate in which a fluorescent material is embedded, for an X-ray detector in accordance with the invention.

In a further preferred embodiment, the fluorescent material consists of a composite comprising needles oriented in an adapted direction, at least one of the composite phases exhibiting fluorescence when struck by the X-rays to be measured.

DETAILED DESCRIPTION OF THE INVENTION

Some preferred embodiments in accordance with the invention will be described in detail hereinafter with reference to the accompanying diagrammatic drawing. FIG. 1 of the drawing shows a multiple X-ray detector in accordance with the invention which can be used, for example, for a scanning X-ray examining apparatus.

An X-ray detector 1 as shown in FIG. 1 comprises a series of X-ray detection elements 2 which are block-shaped in this case. An X-ray beam X is directed onto radiation entrance faces 3 of the X-ray detection elements. For this purpose, an entrance side 5 of the detector 1 is either completely open or is provided with an X-ray transmitting window plate, for example, in order to accommodate the X-ray detection elements in a protective atmosphere. When use is made of a plurality of rows of X-ray detection elements, they are preferably arranged so that the X-radiation is directly incident on each of the elements, i.e. without irradiating neighbouring elements. A construction of this kind may be attractive, because more space is then available for fluorescent radiation measuring devices to be coupled to the X-ray detection elements. The X-ray detection elements are mounted between two supporting plates 7 and 9 which comprise for each of the elements, preferably group-wise alternately in the plate 7 and the plate 9, an aperture for the fluorescent radiation. In this configuration, measuring devices 11 for the fluorescent radiation are situated on each side of the series of X-ray detection elements 2. The measuring devices for the fluorescent radiation comprise, for example constructions, completely analogous to the construction described in the simultaneously filed Netherlands Patent Application Ser. No. 885,670, filed Mar. 13, 1978; in the name of Applicant (not elaborated herein for this reason), a photocathode, means for accelerating and focussing photoelectrons released from the photocathode by the fluorescent radiation, and an electron detector for detecting the electron flow. In the described embodiment, a plurality of, for example, 5 to 20 measuring channels for measuring the fluorescent radiation are accommodated in a measuring device 11.

The dimensions of the X-ray detection elements are for example, $5 \times 5 \times 30$ mm$^3$, a surface of $5 \times 30$ mm$^2$ acting as the radiation entrance face and at least one of the faces of $5 \times 5$ mm$^2$ acting as the scanning face. If use is made of a suitable fluorescent material such as, for example, yttrium silicates and yttrium aluminates, the X-ray detection elements may be blocks of monocrystals, but this is not absolutely necessary. In a preferred embodiment of the detector elements the powdery fluorescent material is contained in a transparent support, for example, in a layer of approximately 0.1 to 0.5 mm, the support serving as a radiation conductor for the fluorescent radiation. The fluorescent material is then present, for example, in the vicinity of one of the focal points of an ellipsoid support, an entrance window for the fluorescent radiation detection device being situated near a second focal point thereof. The fluorescent material can also form a slice or cylinder which is embedded in the support material, it being possible for the support to have, besides a rectangular cross-section, a triangular, a round or another cross-section. In order to achieve optimum yield of the fluorescent radiation, the fluorescent material in a further preferred embodiment is provided in the form of a hollow cylinder in a holder, light conductive material being provided around as well as inside the fluorescent material. Both light conductive elements may then be constructed, by the provision of a core for the inner cylinder and a jacket for the outer cylinder, consisting of a material having a comparatively high diffraction index, as light conductors which are known from glass fibre optics, an example of such an X-ray detection element being shown in FIG. 2.

The fluorescent material may also be embedded in a support of, for example, glass or perspex or another material which remains sufficiently transparent to the fluorescent radiation.

If the fluorescent material is suitable for this purpose, the X-ray detection elements can also be formed by the sintering of, for example, powdery fluorescent material. It has been found that many materials become transparent when sintered, so that a cheap method of forming X-ray detection elements from powdery material is obtained, a detection element in the form of a transparent block formed by such a method being shown in FIG. 3. In a further preferred embodiment, the X-ray detection elements are made of fluorescent material in the form of a composite. When a favourable orientation of, for example, needle-shaped crystallites is ensured, at least one of the composite phases then being fluorescent, a larger part of the fluorescent radiation generated is emitted from the measuring window side, an example of which is shown in FIG. 4. The external shape of the element can then still be chosen at random.

In many cases, efficiency can be improved by constructing all relevant boundary faces of the X-ray detection elements to be reflective. To this end, it may be advantageous to grind these faces to be optically flat and to cover the faces, if necessary, with a layer which is internally reflective for the fluorescent radiation. The scanning window for measuring the fluorescent radiation is then left open and can be roughened, if necessary, in order to reduce reflection therefrom. In cases where several or even a large number of X-ray detection elements are combined for an X-ray detector, it is advantageous to accommodate these elements in a desired mutual orientation in a common block with which each element acts to a larger or smaller extent as a radiation conductor. In this case as well as in the case of separate arrangement, it is desirable to reduce radiation crosstalk between the elements as much as possible. Therefore, for the supporting material for the elements combined use is made of a black glassy carbon in a preferred embodiment, said glassy carbon having a suitable absorption factor for the fluorescent light and enabling a robust construction. When the entrance for the incident X-ray radiation for the X-ray detection elements remains free, this supporting material is preferably made to be absorbing also for the X-radiation to be measured and for any secondary radiation generated thereby, for example, by the addition of heavy elements. The first requirement to be imposed on fluorescent materials suitable for X-ray detection elements in accordance with the invention consists in that the afterglow is comparatively short for the X-radiation to be detected in the medical diagnostic range, for example, between approximately 50 and 150 keV, which means that it should be at least a factor 10 smaller than the afterglow time of the customary NaI:TL. On the other hand, this may not be at the expense of the sensitivity to the radiation to be detected.

Because no severe requirements need be imposed as regards the spatial resolution of the present detector, application other than, for example, for X-ray entrance screens of image forming devices are also feasible. In accordance with the invention, for the phosphors use is notably made of those where an activator can be used which inherently realizes comparatively short afterglow times. Preferred groups of phosphors are phosphors with $Ce^{+++}$ or $Eu^{++}$ as activator lattices, notably yttrium, lanthanum and lutetium combinations being suitable for use. For example, a preferred embodiment of an X-ray detection element in accordance with the invention contains $Y_2Si_2O_5$:Ce as the fluorescent material, in spite of the comparatively low X-ray absorption coefficient thereof. In the below table the light yield, a reciprocal measure for the afterglow, and the product of these two factors, all in relative numbers standardized to 100 for $Y_2SiO_5$:Ce, are shown for the materials NaI:TL and $Bi_4Ge_3O_{12}$ commonly used thus far as well as for some phosphors in accordance with the invention. This product is a direct measure for the suitability of the materials for an X-ray detector of the present type. In order to make the comparison as reliable as possible, the most commonly used preparation method has been used for all materials.

| Material | Light yield | Afterglow | Quality factor |
| --- | --- | --- | --- |
| NaI:Tl | 200 | 1 | 200 |
| $Bi_4Ge_3O_{12}$ | 10 | 200 | 2000 |
| $Y_2SiO_5$:Ce | 100 | 100 | 10000 |
| $Y_2Si_2O_7$:Ce | 120 | 50 | 6000 |
| $Y_3Al_5O_{12}$:Ce | 80 | 25 | 2000 |

What is claimed is:

1. An X-ray detector comprising an X-ray detection element and a detection device responsive to fluorescent radiation generated in said X-ray detection element, said X-ray detection element comprising a fluorescent material having a short afterglow and a high sensitivity for the X-ray radiation to be detected, said fluorescent material comprising at least one of the phosphors $Y_2SiO_5$:Ce, $Y_2Si_2O_7$:Ce or $Y_3Al_5O_{12}$:Ce.

2. The X-ray detector of claim 1 wherein the X-ray detection element is a crystal.

3. The X-ray detector of claim 1 wherein the X-ray detection element contains powdery fluorescent material included within a support transparent to fluorescent radiation.

4. The X-ray detector of claim 3 wherein the fluorescent material forms a hollow cylinder filled as well as surrounded by a transparent support material.

5. The X-ray detector of claim 1 wherein the X-ray detection element is formed by a block of transparent, sintered fluorescent material.

6. The X-ray detector of claim 1 wherein the fluorescent material forms a composite having needles which are oriented in the direction of a measuring window, at least one component of said composite having fluorescent properties.

7. The X-ray detector of claim 1 wherein many X-ray detection elements are present.

8. An X-ray detector as claimed in claim 1, wherein the X-ray detection elements are accommodated in a common support and act therein as light conductors for the fluorescent radiation.

* * * * *